Patented Apr. 18, 1950

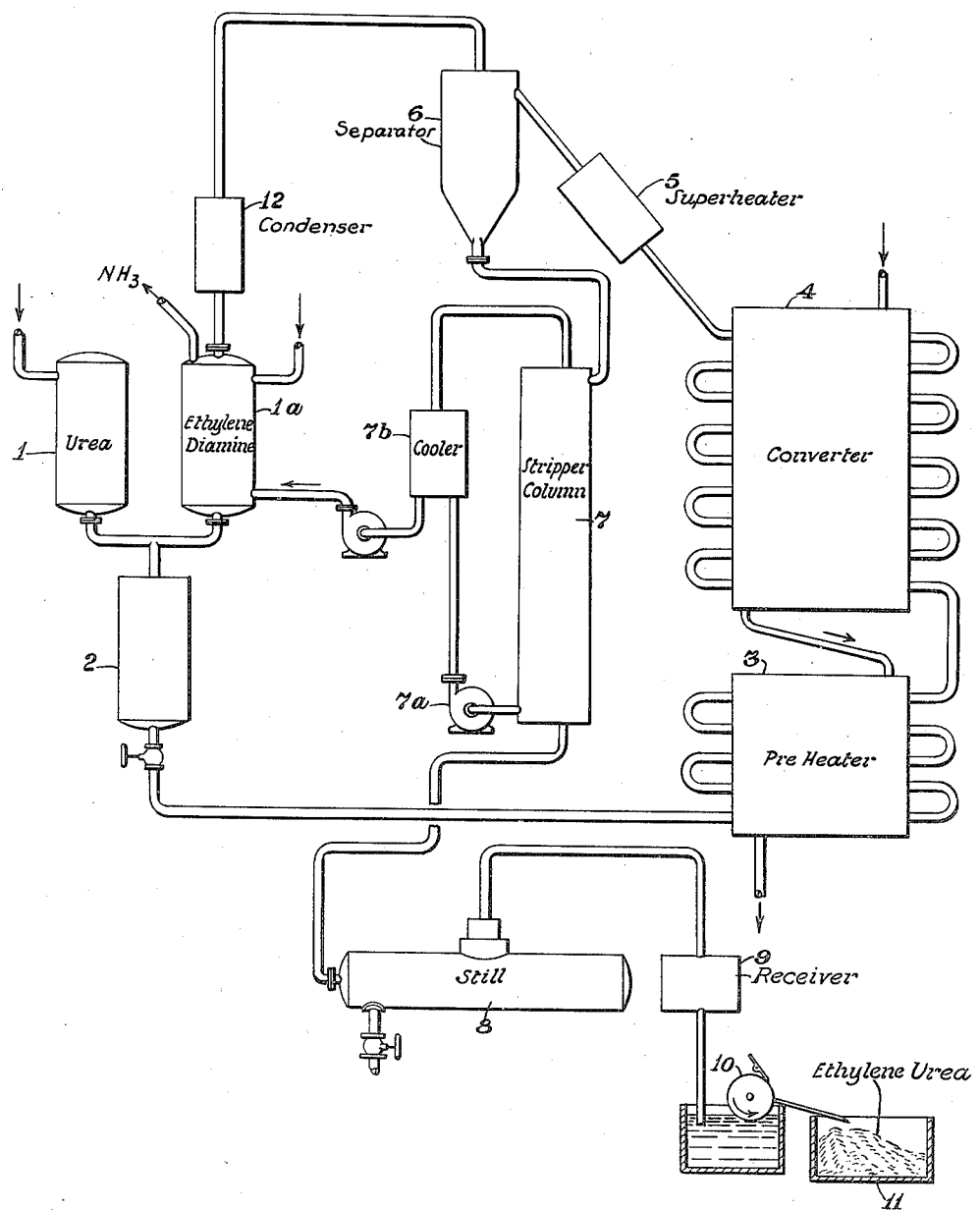

2,504,431

UNITED STATES PATENT OFFICE 2,504,431

PREPARATION OF ETHYLENEUREA

Donald J. Loder, Wilmington, Del., assignor to E. I. du Pont de Nemours & Company, Wilmington, Del., a corporation of Delaware Application March 1, 1944, Serial No. 524,526

1 Claim. (Cl. 260—309)

This invention relates to a process for the preparation of N.N'ethyleneurea, and more particularly to its preparation from urea, water, and ethylene diamine. This application is related to my copending application S. N. 524,521, now abandoned, and 524,524, now U. S. Patent 2,436,311, filed under even date.

N.N'ethyleneurea, hereinafter referred to as ethyleneurea, and otherwise known as 2 oxo imidazolidin and imidazolidon (2), has been made by heating ethylene diamine with diethyl carbonate at 180° C. [E. Fisher, Koch. A232, 227 (1886)], by warming an aqueous solution of N.N'ethylene thiourea with freshly precipitated mercuric oxide [Klut Ar. 240, 677 (1887)], and by distillation of aqueous N.N'ethylene guanidine under diminished pressure [Pierron A 9 (11) 363 (1908)]. Ethyleneurea has remained more or less a laboratory curiosity, however, for the above processes to date have been of only academic significance.

An object of the present invention is to provide improved processes for the preparation of ethyleneurea. Another object of the invention is to provide a process for the preparation of ethyleneurea from ethylene diamine, water, and urea. Yet another object is to provide procedural details for the preparation of ethyleneurea from the aforesaid reactants. A further object is to provide a process for the preparation of ethyleneurea from mixtures of ethylene diamine and water with urea or the decomposition products of urea, under elevated temperatures and pressures. Other objects and advantages of the invention will hereinafter appear.

The invention may be illustrated by the reaction of ethylene diamine with urea in accord with the equation:

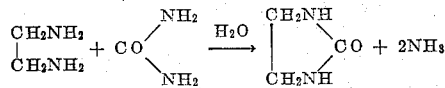

Broadly the process of the invention may be described as involving the treatment of aqueous ethylene diamine with urea or the decomposition products of urea, e. g. carbon dioxide and ammonia. The aqueous ethylene diamine and urea are, for example, charged into a pressure resisting autoclave, the autoclave closed and the contents heated to effect the reaction. The reaction appears to proceed through a series of stages as the temperature rises with a condensation product forming at a temperature of approximately 150° C. If equimolar proportions of ethylene diamine and urea are used this condensation product is a solid. If suitable precautions are taken, however, which are more fully described hereinafter a more fluid mass can be obtained at this stage in the reaction. The solid reaction product or fluid mass is further heated and the solid gradually liquefies as the temperature approaches 200° C. At a temperature of approximately 270° C. the solid particles substantially all disappear. With the semi-solid product also the same phenomenon occurs and because of the fluidity of this mass heat can be more readily added to it than to the solid reaction product. The amount of ethyleneurea produced increases progressively as the temperature increases above 200° C. with substantially complete conversion at 250 to 270° C.

Accordingly the process of this invention is conducted in such a manner that a temperature in excess of 200° C. is attained, the ethyleneurea being produced in substantial amounts when the reactants are heated to a temperature between 200 and 300 and preferably to a temperature between 220 and 270° C. Some ethyleneurea, however, can be produced at temperatures as low as 175° C. but at such temperatures yields are poor.

Elevated pressures may be used, if desired, and may range from above atmospheric pressure to 50 or 500 atmospheres or more. Inasmuch as carbon dioxide and ammonia are normally gases, it is advantageous, if they are used, to introduce them into the reaction at a pressure high enough to maintain the major part of the system in the liquid phase. In the event that water is introduced into the reaction mixture at temperatures above 100° C. pressures, of course, should be used.

The ratio of the ethylene diamine to urea may vary over a wide range. For example, the urea may be present in excess, or the ethylene diamine may be present in excess, giving in the case of excess ethylene diamine, basic reaction conditions. Accordingly, there may be present from 0.1 to 15 moles of urea per mole of the ethylene diamine, on a weight basis. The reaction is, however, preferably conducted with an excess of ethylene diamine in order to prevent the formation of a solid mass during the reaction. A 2 to 20% excess on a molecular weight basis is usually ample for this purpose.

The reaction will produce ethyleneurea in the presence or absence of water but for best results water must be present although aqueous solutions of the ethylene diamine or urea or both may be used. The azeotrope of ethylene diamine (68% diamine, 32% water) can be used with advantage or from 10 to 50% water based on the ethylene diamine. The water markedly increases the yield over reactions conducted under anhydrous conditions and its beneficial effect are particularly noticeable in the reactions conducted under pressure in which the water is present at the higher temperatures. The beneficial effect of water is also present in the batch type atmospheric pressure processes although the greater proportion of water is boiled off during the initial stages of the reaction. The small amount of water retained is believed to be responsible for the more complete conversion of the intermediate condensation product to ethyleneurea.

The ethyleneurea may be separated from the crude reaction mixture by evaporation, by vacuum distillation or by steam distillation, i. e. by heating up the mixture to distillation temperature while passing steam through it. Alternatively, the crude product may be subjected to crystallization for the separation of ethyleneurea, the crystallization being conducted in a suitable solvent therefor.

The examples illustrate preferred embodiments of the invention, wherein parts are by weight unless otherwise indicated.

*Example 1.*—A silver-lined autoclave provided with a reflux condenser was charged with 1 mole of ethylene diamine (containing 23% water) and 1 mole of urea. The mixture was heated to a temperature of about 260° C. At about 150° C. a solid condensation product formed which upon further heating gradually went into solution. Upon analysis a yield of about 92% ethyleneurea based on ethylene diamine was obtained.

The process of Example 1 was repeated except for the differences indicated in these examples.

*Table I*

| Examples | 2 | 3 | 4 | 5 |
|---|---|---|---|---|
| Ethylene diamine...moles | 1.33 | 1 | 1 | 8.3 |
| Urea...do | 0.67 | 1 | 1 | 8.3 |
| Water...do | | 1.55 | 1.55 | 13 |
| Temperature...°C | 230 | 235 | 235 | 235 |
| Pressure...atms | 1 | 1 | 1 | 1 |
| Time...hrs | 6 | 4 | 2 | 4 |
| Yield of ethyleneurea based on ethylene diamine...percent | 65 | 93 | 95 | 98 |

The process may be carried out, if desired, by passing aqueous ethylene diamine and urea continuously into a tubular type reaction zone. Such a process is illustrated in the attached drawing wherein urea and aqueous ethylene diamine are introduced from storage tanks 1 and 1a respectively through mixing tank 2 to preheater 3 wherein the temperature of the mixture is raised to about reaction temperature and from this preheater the mixture is introduced into the converter 4 which is a silver-lined reaction tube of relatively great length to diameter. In this tube the reaction mixture is maintained at a temperature preferably above 200° C. and a pressure above 50 atmospheres provided by the injection of the urea and the ethylene diamine. The reaction mixture issuing from converter 4 is passed through a heater 5 which superheats the mixture above the boiling point of the ethylene diamine and water at normal pressure, the ethylene diamine and water being flashed off of the ethyleneurea in the cyclone separator 6, at a temperature of about 170° C. and at about atmospheric pressure. The ethyleneurea is discharged from the cyclone separator 6 into the ethyleneurea stripping column 7, preferably a packed column, wherein it is stripped of the last of the water and ethylene diamine by countercurrent scrubbing with ammonia (or nitrogen) [recirculated by pump 7a through cooler 7b] at a temperature of approximately 170° C. From the bottom of the stripping column 7 the ethyleneurea is discharged to the ethyleneurea vacuum still 8 from which it is distilled into the receiver 9. The ethyleneurea then passes directly to the flaker roll 10 which consists of a chromium plated cylindrical roll cooled to a temperature of approximately 30° C. upon which the ethyleneurea solidifies and is scraped off in a flake like form into the hopper 11. The ethylene diamine, water and ammonia from cyclone separator 6 are passed into condenser 12 wherein the ethylene diamine and water are condensed, and returned to mixing tank 7, the ammonia being discharged from the storage tank 1a.

*Example 6.*—A reaction was carried out by continuously injecting 1.05 moles of ethylene diamine (containing 32% water) and 1 mole of urea into a silver-lined tubular converter 4 of $\tfrac{9}{16}''$ I. D. and 75 feet in length, the reaction being conducted therein at a pressure of about 75 atmospheres, a temperature of about 275° C. and with a reaction time of from 12 to 15 min. The crude product was continuously discharged from the converter 4 into a heater 5 wherein its temperature was raised to about 380° C., the unreacted ethylene diamine and water were distilled off in the separator 6 and the residue subsequently treated in a stripping column 7 for the removal of unconverted ethylene diamine which was returned to the converter. The stripped product was then passed to a still 8 for the recovery of ethyleneurea in a conversion per pass of about 90 to 95%, based on the ethylene diamine introduced and a conversion of 100% based on the urea.

I claim:

A continuous process for the preparation of ethyleneurea which comprises continuously introducing into a silver lined tubular reaction converter of about $\tfrac{9}{16}$ in. I. D. and about 75 feet in length, a mixture containing urea, water and an excess of ethylene diamine based on the weight of urea, conducting the reaction therein at a pressure of about 75 atmospheres and a temperature of about 275° C., continuously discharging the products from the reaction zone, separating the ethyleneurea from the unreacted ethylene diamine and recycling the latter to the reaction zone.

DONALD J. LODER.

REFERENCES CITED

The following references are of record in the file of this patent:

UNITED STATES PATENTS

| Number | Name | Date |
|---|---|---|
| 1,785,730 | Davis | Dec. 23, 1930 |
| 2,145,242 | Arnold | Jan. 31, 1939 |
| 2,253,528 | Olin | Aug. 26, 1941 |
| 2,257,717 | Olin | Sept. 30, 1941 |
| 2,276,696 | Olin | Mar. 17, 1942 |
| 2,436,311 | Larson | Feb. 17, 1948 |

OTHER REFERENCES

Fisher, Koch, Annalen, vol. 232, page 227 (1886).
Chem. Abstracts, vol. 32, p. 488, citing: Annalen der Chemie, vol. 532, pp. 300–301.
Hansen, "The Synthesis of Ethylene Urea," 1939.